(12) United States Patent
Kapteyn et al.

(10) Patent No.: US 7,072,101 B2
(45) Date of Patent: Jul. 4, 2006

(54) DOWNCHIRPED PULSE AMPLIFICATION

(75) Inventors: Henry C. Kapteyn, Boulder, CO (US);
Sterling J. Backus, Longmont, CO (US)

(73) Assignee: The Regents of the University of Colorado, Boulder, CO (US)

( * ) Notice: Subject to any disclaimer, the term of this patent is extended or adjusted under 35 U.S.C. 154(b) by 145 days.

(21) Appl. No.: 10/436,579

(22) Filed: May 10, 2003

(65) Prior Publication Data
US 2004/0000942 A1    Jan. 1, 2004

Related U.S. Application Data

(60) Provisional application No. 60/379,903, filed on May 10, 2002.

(51) Int. Cl.
*H01S 3/00*    (2006.01)
(52) U.S. Cl. .................................................. 359/337.5
(58) Field of Classification Search ............. 359/337.5
See application file for complete search history.

(56) References Cited

U.S. PATENT DOCUMENTS

| | | | |
|---|---|---|---|
| 4,588,957 A * | 5/1986 | Balant et al. ............. 359/337.5 |
| 4,928,316 A | 5/1990 | Heritage et al. ............. 455/600 |
| 5,235,606 A * | 8/1993 | Mourou et al. ................. 372/25 |
| 5,499,134 A * | 3/1996 | Galvanauskas et al. ..... 359/333 |
| 5,847,863 A | 12/1998 | Galvanauskas et al. .. 359/341.3 |
| 5,862,287 A * | 1/1999 | Stock et al. ................. 385/123 |
| 5,867,304 A * | 2/1999 | Galvanauskas et al. ..... 359/333 |
| 6,072,813 A * | 6/2000 | Tournois ....................... 372/25 |
| 6,081,543 A * | 6/2000 | Liu et al. ..................... 372/102 |
| 6,181,463 B1 | 1/2001 | Galvanauskas et al. ..... 359/330 |
| 6,272,156 B1 * | 8/2001 | Reed et al. .................... 372/25 |
| 6,603,600 B1 * | 8/2003 | Pang .......................... 359/348 |
| 6,804,045 B1 * | 10/2004 | Barty .......................... 359/337 |
| 6,885,683 B1 * | 4/2005 | Fermann et al. .............. 372/25 |

OTHER PUBLICATIONS

Fittinghoff et al. Dispersion Considerations in Ultrafast CPA Systems. IEEE Journal of Selected Topics in Quantum Electronics, vol. 4, No. 2, Mar./Apr. 1998.*

S. Backus, J. Peatross, C.P. Hung, M. M. Mumane, and H. C. Kapteyn, "Ti:sapphire amplifier producing millijoule-level, 21-fs pulses at 1 KHz," Optics Letters/vol. 20, No. 19/Oct. 1, 1995.

Jianping Zhou, Chung-Po Huang, Chegyu Shi, Margaret Mumane,and Henry C. Kapteyn, "Generation of 21-fs millijoule-energy pulses by use of Ti:sapphire," Optics Letters/vol. 19, No. 2/Jan. 15, 1994.

* cited by examiner

*Primary Examiner*—Deandra M. Hughes
(74) *Attorney, Agent, or Firm*—Macheledt Bales & Heidmiller, LLP; Jennifer L. Bales

(57) ABSTRACT

An ultrashort pulse amplifier produces high-power ultrafast laser pulses. Pulses first have net negative (i.e. blue to red) chirp applied, and are then amplified in a laser amplifier. After amplification, the pulses are compressed using propagation through a block of material or other convenient optical system with a positive sign of chromatic dispersion. High-order dispersion correction may also be included.

36 Claims, 3 Drawing Sheets

DOWNCHIRPED PULSE AMPLIFICATION

BACKGROUND OF THE INVENTION

This application claims the benefit of U.S. Provisional Application No. 60/379,903 filed May 10, 2002.

FIELD OF THE INVENTION

The present invention relates to techniques for amplifying ultrashort pulses.

PROBLEMS IN THE ART

The technique of Chirped-Pulse Amplification (CPA) is well established as a method for generating high peak-power pulses with duration of approximately 10 femtoseconds to 10 picoseconds. In CPA, ultrashort light pulses originating from a mode-locked laser are "chirped" by passing them through either a dispersive pulse stretcher, by propagating the light through an optical fiber, or through some other means of introducing a positive (sometimes called "normal") chromatic dispersion. Positive, or normal, chirping results in a pulse whose instantaneous frequency increases in frequency from beginning to end.

The effect of the "chirp" is to increase the time-duration of the light pulse. An ultrashort light pulse necessarily has a broad spectral bandwidth. The pulse stretcher is a device that possesses a wavelength-dependent optical path length; i.e. different color components have differing transit times through the compressor. Thus, an ultrashort light pulse becomes spread in time, often by a factor of 10,000 times or more; i.e. a 10 fs light pulse can emerge from a pulse stretcher with a time duration of >100 picosecnds.

This results in a light pulse that is dramatically lower in peak intensity, for a given pulse energy, than the original pulse. However, it still possesses the frequency spectrum necessary for a much-shorter pulse. The lower peak power of the light pulse makes it possible to amplify the pulse to high energy without damaging or distorting the pulse due to nonlinear effects and material breakdown associated with very high peak-intensity light pulses. Subsequently, a pulse "compressor" is used to provide a wavelength-dependent optical path length that "undoes" the effect of the stretcher, regaining an ultrashort pulse with dramatically higher peak power than was present in the amplifier system itself.

However, this scheme of "chirped-pulse amplification" has significant limitations, primarily associated with the pulse compression process. These limitations include the presence of "high-order dispersion" (HOD) in the cumulative stretcher/compressor system that is difficult or impossible to eliminate from the CPA laser system. This HOD limits the pulse duration ultimately obtained from the laser. In addition to high-order dispersion, other limitations exist, primarily in the construction and alignment of the pulse compressor itself. Pulse compressors tend to exhibit "spatial chirp," or a physical separation of the colors of a pulse, if even slightly misaligned. Furthermore, pulse compressors tend to exhibit high loss.

All past implementations of chirped-pulse amplification have used a configuration where the pulse being amplified has a "positive" chirp. The pulse stretcher is configured such that the "redder" components of the pulse emerge from it earlier than the bluer components. After amplification, the compressor then "undoes" this by providing a "negative" dispersion; i.e. in the compressor the redder components have a longer optical path length than the bluer components.

In a properly designed system, the "net" dispersion of the entire optical system, including the stretcher, the amplifier components, and the compressor, is designed to be as-nearly zero as possible. In this way, an ultrashort pulse injected into the system emerges as an ultrashort pulse, even through it may have been "stretched" by 10,000 times within the amplifier. Typically, the pulse compressor consists of a pair of diffraction gratings, or an equivalent configuration. In some past work, prisms, or a combination of prisms and "chirped" mirrors, have been used for the compression process.

The reason why amplification of pulses with positive chirp is preferred is partly historical, and partly because past implementations have had good reason to use pulses with positive chirp. Historically, the first implementation of CPA used a long optical fiber for pulse stretching. At the typical laser wavelengths of 800–1064 nm for most CPA systems, materials are "normally" dispersive, in that longer wavelengths propagate faster (i.e. experience lower index of refraction) than short ones. Thus, fiber propagation yields a pulse with positive chirp. This positive chirp can be counteracted by the negative chirp of a grating pair. Grating compressors are simple, and use only reflective optics, thus avoiding nonlinear pulse distortions. Very large-area gratings can now be made, making it possible to generate peak powers of up to a petawatt.

There are other good reasons why past systems have universally employed positively chirped, rather than negatively-chirped, pulses. First, a negatively-chirped pulse tends to shorten in duration as it propagates through the amplifier system, since the amplifier generally contains optical components with positive dispersion. This makes it more difficult to avoid the problems that CPA is intended to solve, and makes it necessary for the pulse stretcher to introduce substantially more negative chirp on the pulse than the amplifier will introduce positive chirp. Since commonly used ultrashort-pulse "regenerative amplifiers" often employ total internal material path lengths of meters, this can be impractical. In contrast, positive dispersion further lengthens a positively-chirped pulse. In a diffraction grating pulse compressor this is simpler for the compression of positively-chirped pulses, avoiding complexity and optical power losses. If negatively-chirped pulses were used instead, along with an alternate source of positive dispersion for compression such as propagation through material, the total amount of material required to compress a pulse of the duration typically used in the most common design ultrashort-pulse amplifiers would be large-meters or tens of meters of material. This would only generally be practical if optical fiber were used. However, optical fibers possess very small cross-sectional area, limiting the peak power that could be emitted from the end of the fiber. Furthermore, high-order dispersion would be very severe in any system employing large amounts of material for pulse compression. Thus, the prospects for using negatively-chirped light pulses in the chirped-pulse amplification process have never previously been seriously considered, either for fiber-optic amplifier systems, or for "free-space" optical amplifiers.

However, grating pulse compressors are also lossy and bandwidth-limiting devices, and thus limit the peak power and pulse duration from the system. This results from the necessity for several (typically four) reflections from a diffraction grating. A typical grating used for this purpose has a first-order reflection efficiency of 85–95% so the resulting throughput is $(0.85)^4$-$(0.95)^4$, or around 52%–81% Furthermore, grating compressors require very-sensitive alignment to avoid "spatial chirp;" i.e. physical separation of the colors emerging from the amplifier. Other limitations include beam distortions due to grating imperfections and non-uniform heating and expansion of the grating surface due to light absorbed into the gratings.

The use of prisms, rather than gratings, has been employed as a method to avoid some of these limitations; however, prisms do not avoid spatial dispersion effects, and furthermore typically need to use specially-designed mirrors to compensate for residual higher-order dispersion.

Thus, there exists a need for an alternative technique for compression of chirped optical pulses emerging from an ultrafast laser amplifier or other optical device.

SUMMARY OF THE INVENTION

The present invention includes an alternative technique for compression of chirped optical pulses emerging from an ultrafast laser amplifier or other optical device that avoids many of the problems associated with grating pulse compressors by utilizing downchirped pulse amplification. The pulse is stretched using negative dispersion. The pulse injected into the amplifier is thus negatively chirped; i.e. the blue colors come first in the pulse, while the red colors come later. This pulse stretching can be accomplished using the same types of negative-dispersion elements that are normally employed for recompressing a pulse in a chirped-pulse amplifier system; i.e. a grating pair, or prism pair. Other possible optical elements that might be included are specially-designed mirrors that compensate for dispersion, or correct for high-order dispersion errors introduced by other optical elements, or "pulse shapers" that use adaptive-optics devices to adjust pulse dispersion either in a predetermined, or a programmable manner.

Although similar elements, such as grating pairs, are used in some embodiments of the present invention as were employed in the prior art, there is an important difference. The grating pairs are used before amplification, so that the loss induced can be made up for with just a slightly higher gain in the amplifier.

Compression of the optical pulses after amplification is therefore accomplished using positive dispersion. One advantageous way of doing this is by using material dispersion; i.e. propagating the pulse through a block of glass or other transparent material. Other devices, such as the positive dispersion grating arrangement used for pulse stretchers in CPA systems, can also be used.

However, the use of a simple transparent optical element has a number of very significant advantages over past pulse compressor designs. First, a transparent material can be virtually lossless. Thus, the 30–50% loss in average power typical of a grating pulse compressor can be avoided. Furthermore, thermal distortion effects are also avoided. Second, a simple block of glass is alignment insensitive, making alignment of the pulse compressor, and accurate dispersion compensation, much simpler to obtain.

Features of the present invention include elements which deal with the following issues:

1) High-order dispersion compensation. The optical design of the DPA pulse stretcher is done very carefully, and various embodiments include a variety of optical elements specifically for the purpose of high-order dispersion compensation. Although the present invention can be used without HOD compensation, the shortest pulse duration obtainable would be limited. One preferred embodiment for this stretcher incorporates both a prism pair and a grating pair.

2) Nonlinear distortion of the pulse in the compression process. After amplification, the pulse beam is expanded to a larger physical cross section. By expanding the beam enough, the peak power inside the compressor is kept low enough to avoid nonlinear distortions. Typically the beam from a conventional CPA laser amplifier must be expanded anyway to avoid damage to the gratings.

3) Dispersion within the amplifier itself. The negatively chirped pulse that is injected into the amplifier experiences positive dispersion within the amplifier itself, and will tend to shorten in duration. If the pulse shortens significantly before exiting the amplifier, it could result in damage to the optical system, or nonlinear distortion. Thus, the total cumulative positive, dispersion of the amplifier is designed to be less than, or comparable to, the dispersion of the compressor itself. This requirement is particularly compatible with the use of a multipass laser amplifier, which typically has a much smaller material path length than a regenerative amplifier.

DETAILED DESCRIPTION OF THE PREFERRED EMBODIMENTS

Figure 1:
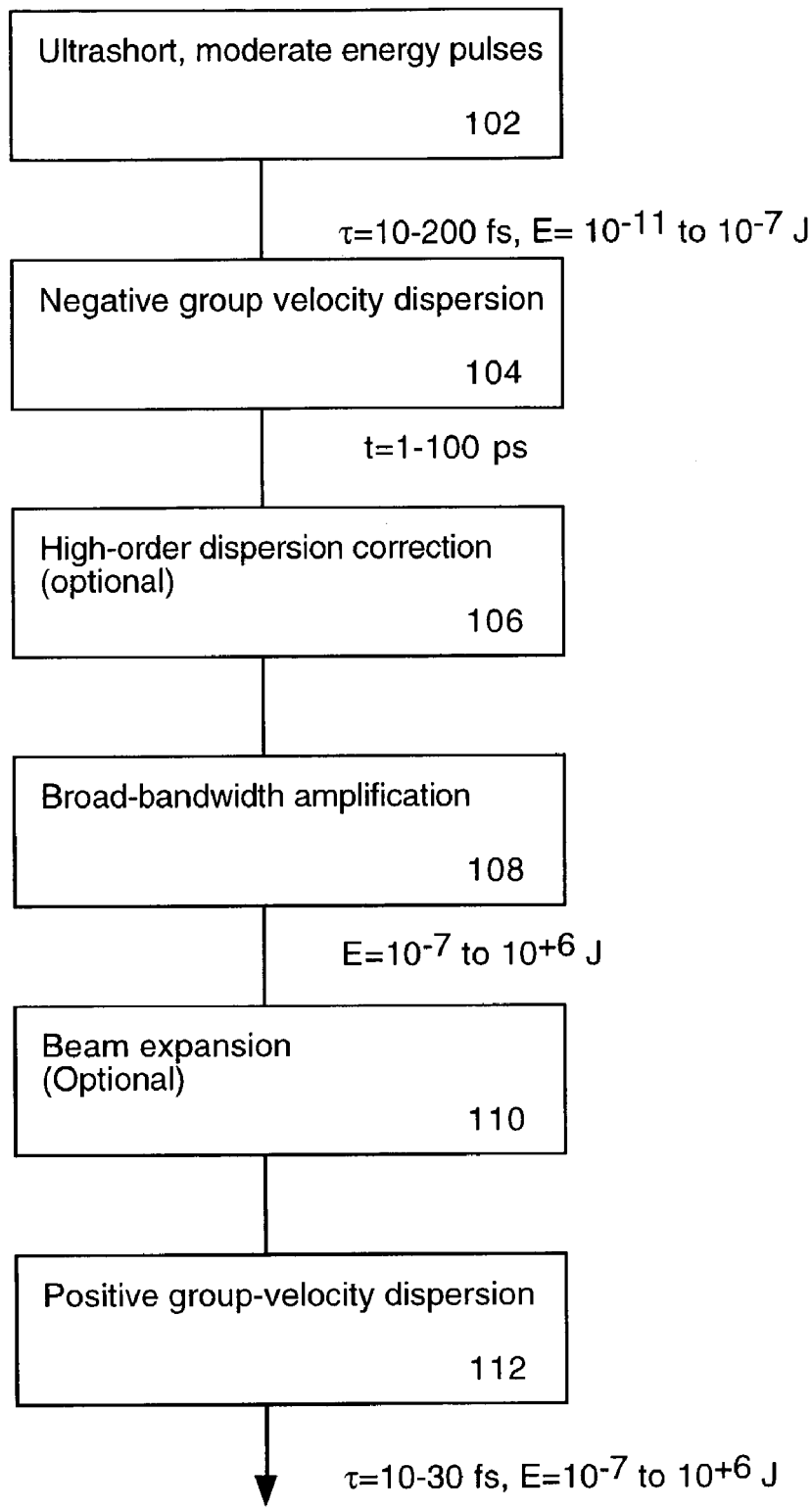
FIG. 1 is a flow diagram illustrating the downchirped pulse amplification technique of the present invention.

FIG. 1 is a flow diagram illustrating the downchirped pulse amplification (DPA) technique of the present invention. In step 102, the initial, low energy, ultrashort pulse is generated. A typical length of such a pulse is 10–20 femtoseconds, and a typical energy is $10^{-11}$ to $10^{-7}$ Joules. In step 104 the pulse is stretched using negative group velocity dispersion, resulting in a much longer, negatively chirped pulse. The length of the pulse might be on the order of 1 to 100 picoseconds. In step 106, high-order dispersion correction is applied. This step is not required, but is desirable. In practice, steps 104 and 106 are performed simultaneously using a combination of optical elements in an order that can often be interchanged.

In step 108 broad-band amplification is applied to the stretched pulse. The energy of the pulse would be on the order of $10^{-7}$ to $10^{+6}$ Joules after amplification. Step 110 accomplishes beam expansion, if desired. Beam expansion is useful for preventing nonlinear distortion and limiting damage to optical elements such as gratings.

Finally, step 112 applies positive group-velocity to the the amplified, stretched beam, resulting in a high energy, ultrashort pulse. Typical pulse length is about 10 to 30 femtoseconds, and typical energy is $10^{-7}$ to $10^{+6}$ Joules.

Figure 2:
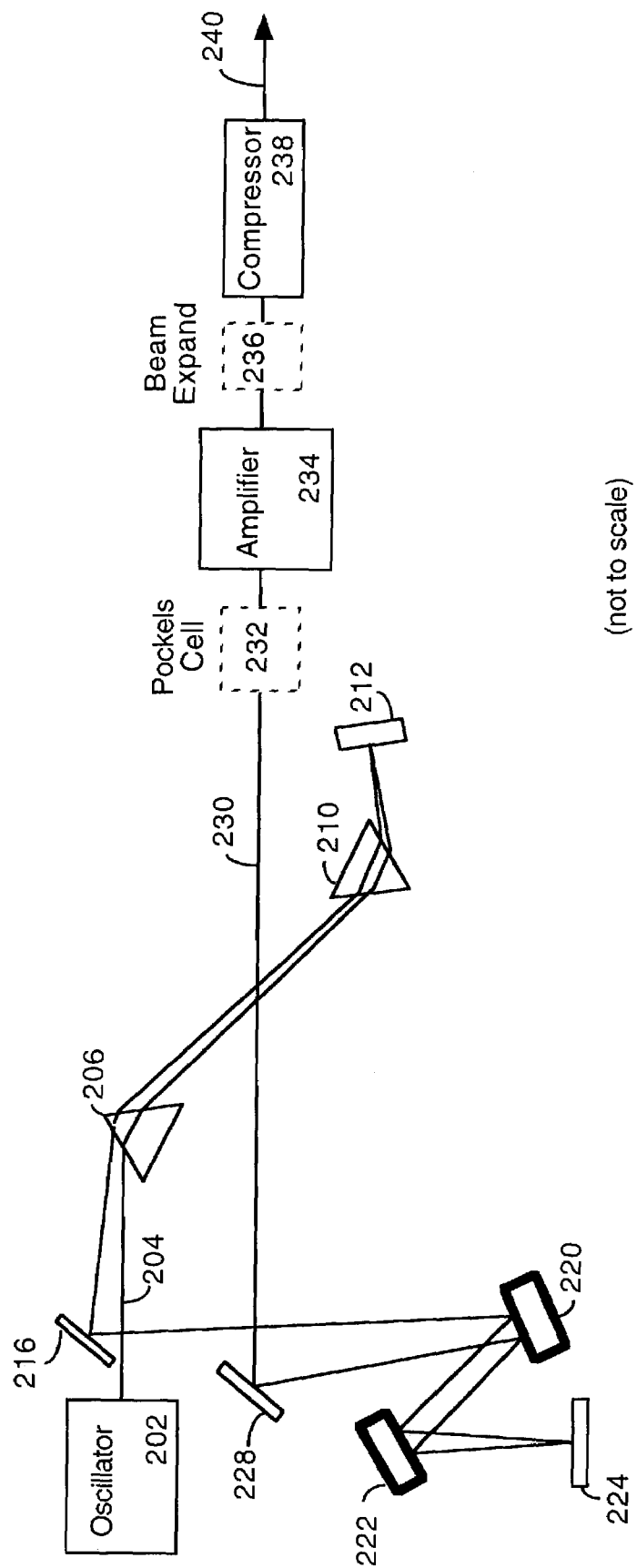
FIG. 2 is a block diagram illustrating one preferred embodiment of the present invention.

FIG. 2 is a block diagram illustrating one preferred embodiment of the present invention. Oscillator 202 is typically a conventional moderate-power, ultra-short pulse generator (such as a mode=locked Ti:sapphire laser) which generates pulses on the order of 10 to 20 femtoseconds long, with power of about $10^{-11}$ to $10^{-7}$ Joules energy. In the embodiment of FIG. 2, these ultra-short pulses next travel through an optical subsystem that both stretches the pulses via negative group velocity dispersion and also corrects for high order dispersion. A pulse-shaper (see FIG. 3), incorporating either a programmable optical element such as a liquid crystal modulator, an acousto-optic modulator, or a deformable mirror, or alternatively a fixed optical element such as a phase mask, can also be incorporated into the system to allow for further HOD compensation.

This subsystem comprises a pair of prisms 206, 210, a pair of gratings, 220, 222, and mirrors 216, 212, 224, and 228. The use of both gratings and prisms gives a number of parameters to adjust in the stretching, including angle and separation of the gratings, and separation and material insertion of the prisms. This number of adjustable parameters makes it possible to compensate for high-order dispersion elsewhere in the system.

In the embodiment of FIG. 2, the ultra-short pulses generated by oscillator 202 initially bypass mirror 216 and pass twice through the pair of prisms, 206 and 210, reflected by mirror 212. At this point, the pulses reflect off mirror 216 bypass mirror 228 and reflected twice off of gratings pair 220, 222 by mirror 224. Next, the pulses reflect off mirror 228 and continue to the rest of the system.

Stretched pulses 230 are typically on the order of 1–100 picoseconds after stretching. Commonly, a Pockels cell 232 is used to isolate a specific pulse for amplification. If oscillator 202 produces pulses which are separated enough to meet system requirements, Pockels cell 232 is not necessary.

Amplifier 234 is preferably a multipass free-space amplifier, for example a ti:sapphire amplifier. A typical small-signal gain per pass is a factor a 5–10; after 8–12 passes the pulse can emerge with a pulse energy of >1 millijoule, after starting with an energy of ~1 nanojoule. Amplifier 234 generates high energy stretched pulses, having typical energies of $10^{-7}$ to $10^{+6}$ Joules. Since these are very high energy pulses, it is often desirable to expand the beam via beam expander 236 (typically using a pair of lenses or curved mirrors), to prevent nonlinear effects or damage to optical elements. Then, the high energy pulses are compressed (dechirped) by compressor 238, resulting in high energy, ultrashort pulses. These typically have lengths of 10–30 femtoseconds and energies of $10^{-7}$ to $10^{+6}$ Joules.

Compressor 238 is preferably a block of glass or other transparent material, but could also be, for example, a pair of positive dispersion gratings in a positive-dispersion configuration, as is used for stretching in CPA systems. A block of glass or the like is virtually lossless, thermal dispersion effects are avoided, and alignment issues are avoided.

It is important to note here that, although this embodiment of downchirped pulse amplification still uses a grating pair 220, 222 as in conventional CPA, there is an important difference. The grating pair is now used before laser amplifier 234, where the pulse energy is low and the beam cross-section area can be comparatively small. Furthermore, in many cases the grating separation will be small. The grating pair is also near the "origin" of the laser pulse in the oscillator. Thus, beam-pointing variations will have a smaller effect on alignment through the grating pair. Furthermore, since the grating pair is used before amplification, loss in the pair can be made-up with just a slightly higher gain in the amplifier system. All these factors make the use of a grating pair before amplification much more desirable than using it after amplification.

Effective dispersion compensation in such a system is demonstrated in the following calculation. An ultrafast laser amplifier of the design previously used in a conventional CPA setup consists of the following materials, NOT including either the pulse stretcher or the compressor:

| Element name | Material | Path length | GVD ($fs^2$) | TOD ($fs^3$) | FOD ($fs^4$) |
| --- | --- | --- | --- | --- | --- |
| Polarizers | Calcite | 2 Cm | 793 | 420 | −23 |
| Pockels cell | KD*P | 2 Cm | 583 | 882 | −717 |
| Laser amplifier-12 passes | Ti:sapphire | 10 cm | 2720 | 1980 | −720 |
| TOTAL | | | 4096 | 3282 | −1460 |

The last three columns list the linear group-velocity dispersion, the third, and the fourth-order dispersion. To first approximation, the total dispersion, in each order, should add to zero for the entire amplifier system to obtain the best pulse fidelity. The numbers in the present example don't precisely add to zero, because they were predicted by numerical optimization to minimize output pulse duration, including effects of all orders of dispersion. The stretcher stage consists of a pair of SF-18 glass, Brewster-cut (60Y apex angle) prisms, separated by 1.905 meters, along with a pair of 600 g/mm gratings separated by 50 mm. A deformable mirror pulse shaper is also incorporated to provide adjustable dispersion compensation; it is initially set to do no compensation. The net result of this dispersion is that a pulse of initial duration 15 fs is stretched to 7 ps duration after the stretching stage. The compressor stage consists of a block of SF-18 glass 25 cm long. In summary the stretcher and compressor are:

| Element name | Material | parameters | GVD (fs2) | TOD (fs3) | FOD (fs4) |
| --- | --- | --- | --- | --- | --- |
| Prism pair | SF-18 | Tip-tip 1.905 m, $\lambda_r$ = 650 nm | −7530 | −62300 | −123000 |
| Grating pair | 600 g/mm | 50 mm separation 45 Y angle | −35100 | 39500 | −62500 |
| Compressor | SF-18 | 25 cm | 38600 | 24600 | 5330 |
| TOTAL | | | −4030 | 1800 | −180170 |

The net dispersion in the system is GVD: 66 $fs^2$; TOD: 5082 $fs^3$; FOD: −181630 $fs^4$. Here, we assume that the input pulse is 15 fs in duration, with a bandwidth of 64 nm centered at 800 nm. After stretching, amplification by a factor of $10^6$, and recompression, the pulse duration is 30 fs. Further improvements in pulse duration at the output can be obtained by adjusting the pulse shaper.

Figure 3:
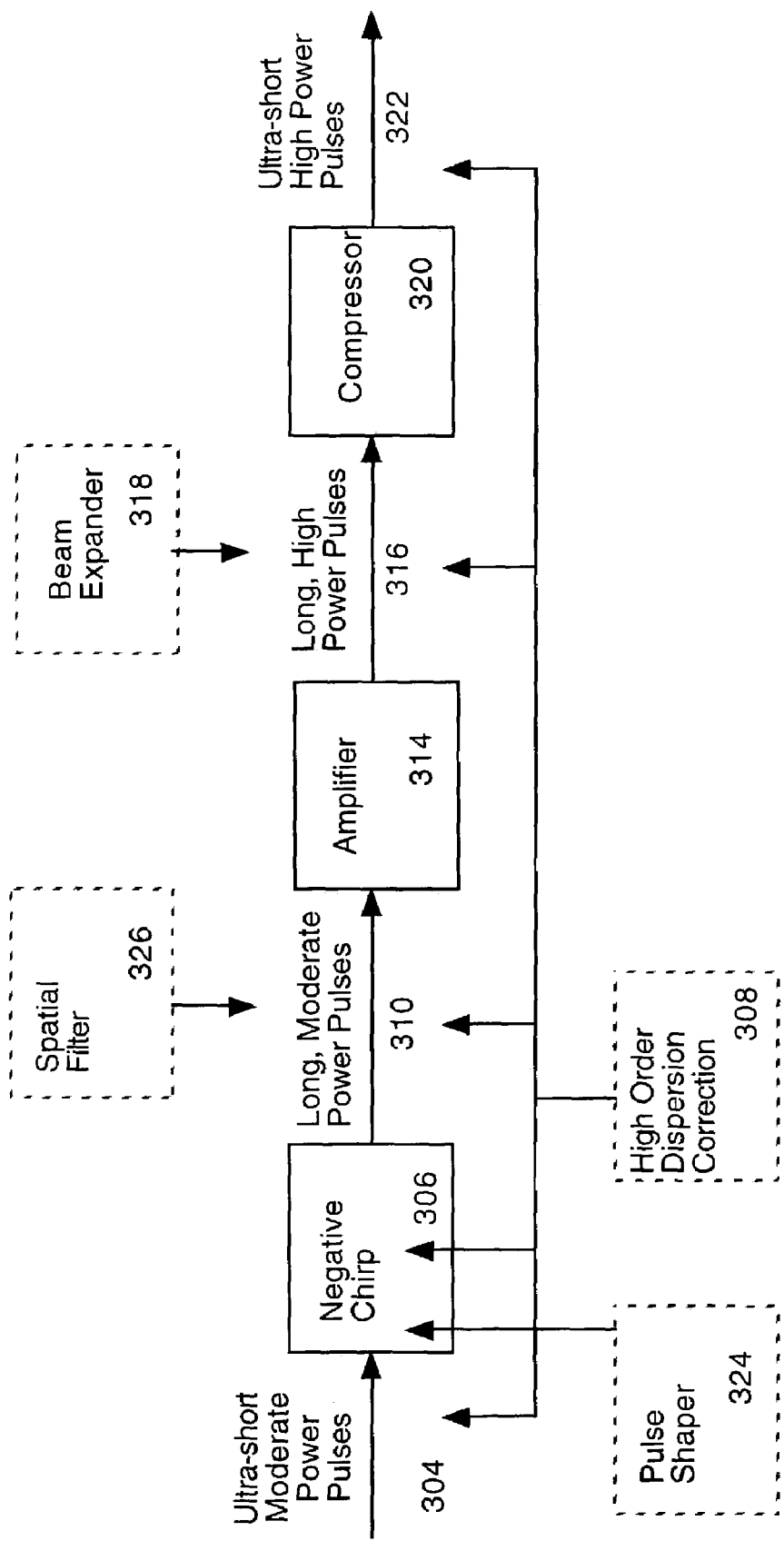
FIG. 3 is a block diagram of a more generalized embodiment of the present invention.

FIG. 3 is a block diagram of a more generalized embodiment of the present invention. While FIG. 2 illustrated a specific embodiment, FIG. 3 is intended to illustrate options and alternative configurations that can be used within the pulse amplifier of the present invention.

Ultra-short, moderate power pulses 304 will in all cases pass through negative chirp block 306, amplifier 314, and compressor 320. As options, pulse amplifier 300 may include optical elements 308 for correcting high-order dispersion. In FIG. 2, this function was performed along with, and by the same elements as, the negative group velocity dispersion. However, high-order dispersion correction may be applied anywhere in the optical system and combined with a number of optical elements, including before or after negative chirp block 306, after amplifier 314, and after compressor 320. If amplifier 314 or compressor 320 introduces nonlinear distortions to the pulse, placing dispersion correction 308 after compressor 320 is practical.

Negative chirp element 306 may comprise a prism pair or a grating pair (or both as in the embodiment of FIG. 2), or other optical elements or series of optical elements that apply negative chirp to the pulse.

Beam expander 318 is desirable to avoid nonlinear distortion of the pulse as it passes through compressor, by expanding the cross section of the beam. For example, a beam having a cross section of 0.25 cm might be expanded to have a cross section of 1.0 cm. Such a beam expander might comprise a lens or mirror for defocussing the beam, and a second lens or mirror for recollimating the beam once it has reached the right size.

Another option is a pulse-shaper 324, incorporating either a programmable optical element such as a liquid crystal modulator, an acousto-optic modulator, or a deformable mirror, or alternatively a fixed optical element such as a phase mask, can also be incorporated into the system to allow for further HOD compensation. This pulse shaper may be incorporated into the grating pair or prism pair shown in the embodiment of FIG. 2, for simplicity. One example of this would be to replace the retroreflecting mirror for the grating pair or prism pair with a deformable mirror to provide for fine adjustments of higher-order dispersion.

Another option is a spatial filter 326 in the beam path, after the pulse stretching elements 306 and before or after amplifier 314. Such a spatial filter consists of a focusing element and an aperture; the aperture size is chosen to aperture all but the lowest-order spatial mode. The aperture is followed by a collimating element. Such a spatial filter can serve to eliminate beam aberrations, and also to help ensure that there is no residual spatial chirp present in the system from the grating or prism pair, or other sources.

It should also be noted that there are some cases where it might be desirable to design compressor 320 to obtain a significant accumulated nonlinear phase. This nonlinear phase can result in significant spectral broadening of the pulse, which can subsequently be recompressed to further shorten the pulse duration. This self-phase modulation process has been used extensively in optical fiber pulse compression, and also in the case of "bulk" optical compression where a beam with carefully controlled spatial profile is allowed to propagate through a bulk material, experience spectral broadening, and then be recompressed. In the DPA case, this self-phase modulation can be accomplished by taking care to obtain a uniform spatial profile, and by arranging that the pulse is compressed to its final duration before the end of the compressor. The pulse will emerge with a broadened spectrum and significant positive chirp, which can then be compressed using gratings, prisms, and/or chirped mirrors. Nonlinear distortion could also be used to narrow the bandwidth of the pulses emerging from the amplifier, since self-phase modulation can narrow the spectrum of a pulse with negative chirp.

What is claimed is:

1. A pulse amplifier for generating high-power ultra-short pulses from moderate-power ultra-short pulses comprising:
    a subsystem configured for applying negative group velocity dispersion to the moderate-power ultra-short pulses to generate moderate power, longer-duration pulses having negative chirp;
    an amplifier configured for amplifying the moderate power, long pulses to generate high power long pulses; and
    a compressor configured for de-chirping the moderate power, long pulses by applying positive group velocity dispersion to generate ultra-short, high power pulses;
    wherein the negative dispersion subsystem is configured to apply sufficient negative dispersion to result in pulses having negative chirp after the amplifier amplifies the pulse; and
    wherein the negative dispersion subsystem is configured to result in sufficient pulse stretching to avoid nonlinear distortion within the amplifier or damage to the amplifier.

2. The pulse amplifier of claim 1, further comprising high-order dispersion correction apparatus.

3. The pulse amplifier of claim 1, wherein the amplifier comprises one of either a free-space, multi-pass amplifier, a single pass amplifier, or a regenerative amplifier.

4. The pulse amplifier of claim 3, wherein the amplifier comprises a free-space, multi-pass ti:sapphire amplifier.

5. The pulse amplifier of claim 3 operating in the range of wavelengths shorter than about 1.3 microns.

6. The pulse amplifier of claim 1 wherein the ultra-short pulses are about 10–200 femtoseconds in duration and the longer-duration pulses are about 1 to 100 picoseconds in duration.

7. The pulse amplifier of claim 1, further including a beam expander after amplifier for expanding the beam diameter of the high power long pulses.

8. The pulse amplifier of claim 1, further including a spatial filter.

9. The pulse amplifier of claim 1, further including a pulse shaper.

10. The pulse amplifier of claim 1 wherein the compressor comprises a block of transparent material.

11. A pulse amplifying subsystem for generating high-power longer duration pulses from moderate-power ultra-short pulses comprising:
    a subsystem configured for applying negative group velocity dispersion to the moderate-power ultra-short pulses to generate moderate power, longer-duration pulses having chirp; and
    an amplifier configured for amplifying the moderate power, long pulses to generate high power long pulses;
    wherein the negative dispersion subsystem is configured to apply sufficient negative dispersion to result in pulses with negative chirp after the amplifier amplifies the pulses; and
    wherein the negative dispersion subsystem is configured to result in sufficient pulse stretching to avoid nonlinear distortion within the amplifier or damage to the amplifier.

12. The subsystem of claim 11, further including a compressor configured for de-chirping the moderate power, long pulses by applying positive group velocity dispersion to generate ultra-short, high power pulses.

13. The pulse amplifier of claim 12 wherein the compressor comprises a block of solid or liquid transparent material.

14. The pulse amplifier of claim 11, further comprising high-order dispersion correction apparatus.

15. The method of generating high-power ultra-short pulses from moderate-power ultra-short pulses comprising the steps of:
    applying negative group velocity dispersion to the moderate-power ultra-short pulses to generate moderate power, longer-duration pulses having negative chirp;
    amplifying the moderate power, long pulses to generate high power long pulses; and compressing and de-chirping the moderate power, long pulses by applying positive group velocity dispersion to generate ultra-short, high power pulses;

wherein the step of applying negative dispersion applies sufficient negative dispersion to result in pulses with negative chirp after the amplifier amplifies the pulses; and wherein the step of applying negative dispersion results in sufficient pulse stretching to avoid nonlinear distortion within the amplifier or damage to the amplifier.

16. The method of claim 15, further comprising the step of correcting high-order dispersion.

17. The method of claim 15, further comprising the step of expanding the beam diameter of the high power long pulses.

18. The method of claim 15, further comprising the step of spatially filtering the pulses.

19. The method of claim 15, further comprising the step of shaping the pulses.

20. The pulse amplifier of claim 1 wherein the subsystem for applying negative chirp includes at least one of the following combinations:
a pair of double-pass diffraction gratings;
pair of double-pass prisms;
dispersive mirrors.

21. The pulse amplifier of claim 1, wherein the compressor comprises a bulk material that is non-resonant near the spectral region of the pulses and has positive dispersion characteristics.

22. The pulse amplifier of claim 21 wherein the compressor bulk material operates in a free space geometry.

23. The pulse amplifier of claim 1, wherein the negative chirp subsystem stretches the pulses on the order of at least 100 times.

24. The pulse amplifier of claim 1 wherein a high-power ultra-short pulse generated from a moderate-power ultra-short pulse has energy between $10^{-7}$ and $10^6$ Joules and said energy is at least 5 orders of magnitude higher than energy of the moderate-power ultra-short pulse.

25. The pulse amplifier of claim 1, wherein the compressor applies positive dispersion in a free space geometry.

26. The pulse amplifier of claim 14, wherein the compressor comprises a bulk material that is non-resonant near the spectral region of the pulses and has positive dispersion characteristics.

27. The method of claim 16 wherein the compressing step is accomplished using a bulk material that is non-resonant near the spectral region of the pulses and has positive dispersion characteristics.

28. The method of claim 27 wherein the compressing step occurs in a free space geometry.

29. The method of claim 16 wherein the step of applying negative dispersion stretches the pulse on the order of at least 100 times.

30. A pulse amplifier configured for generating high-power ultra-short pulses from moderate-power ultra-short pulses comprising:
a subsystem configured for applying negative group velocity dispersion to the moderate-power ultra-short pulses to generate moderate power, longer-duration pulses having negative chirp;
an amplifier configured for amplifying the moderate power, long pulses to generate high power long pulses; and
a compressor configured for de-chirping the moderate power, long pulses by applying positive group velocity dispersion to generate ultra-short, high power pulses;
wherein the amplifier is configured to operate in saturated gain mode; and
wherein the negative dispersion subsystem is configured to result in sufficient pulse stretching to avoid nonlinear distortion within the amplifier or damage to the amplifier.

31. The pulse amplifier of claim 30 operating in the range of wavelengths shorter than about 1.3 microns.

32. The pulse amplifier of claim 30 wherein the ultra-short pulses are about 10–200 femtoseconds in duration and the longer-duration pulses are about 1 to 100 picoseconds in duration.

33. The pulse amplifier of claim 30, wherein the compressor comprises a bulk material that is non-resonant near the spectral region of the pulses and has positive dispersion characteristics.

34. The pulse amplifier of claim 30, wherein the compressor applies positive dispersion in a free space geometry.

35. The pulse amplifier of claim 30, wherein the negative chirp subsystem stretches the pulses on the order of at least 100 times.

36. The pulse amplifier of claim 30 wherein a high-power ultra-short pulse generated from a moderate-power ultra-short pulse has energy between $10^{-7}$ and $10^6$ Joules and said energy is at least 5 orders of magnitude higher than energy of the moderate-power ultra-short pulse.

\* \* \* \* \*

UNITED STATES PATENT AND TRADEMARK OFFICE
CERTIFICATE OF CORRECTION

PATENT NO. : 7,072,101 B2
APPLICATION NO. : 10/436579
DATED : July 4, 2006
INVENTOR(S) : Kapteyn et al.

It is certified that error appears in the above-identified patent and that said Letters Patent is hereby corrected as shown below:

Under "OTHER PUBLICATIONS", line 4, delete "Mumane" and insert --Murnane--.

Under "OTHER PUBLICATIONS", line 9, delete "Mumane" and insert --Murnane--.

Column 2, line 65, after "81%" insert --. --.

Column 4, line 14, delete "positive, dispersion" and add --positive dispersion--.

Column 4, line 52, delete extra "the".

Column 5, line 30, delete "a factor a" and insert --a factor of--.

Column 6, line 23, delete "60Y apex angle" and insert --60° apex angle--.

Column 6, line 43, delete "45 Y angle" and insert --45° angle--.

Signed and Sealed this

Twenty-third Day of January, 2007

JON W. DUDAS
*Director of the United States Patent and Trademark Office*